F. H. JURY.
Children's Carriage.

No. 215,283. Patented May 13, 1879.

WITNESSES
E. F. Nottingham
Geo. D. Seymour

INVENTOR
F. H. Jury
By H. A. Seymour
ATTORNEY

F. H. JURY.
Children's Carriage.
No. 215,283. Patented May 13, 1879.

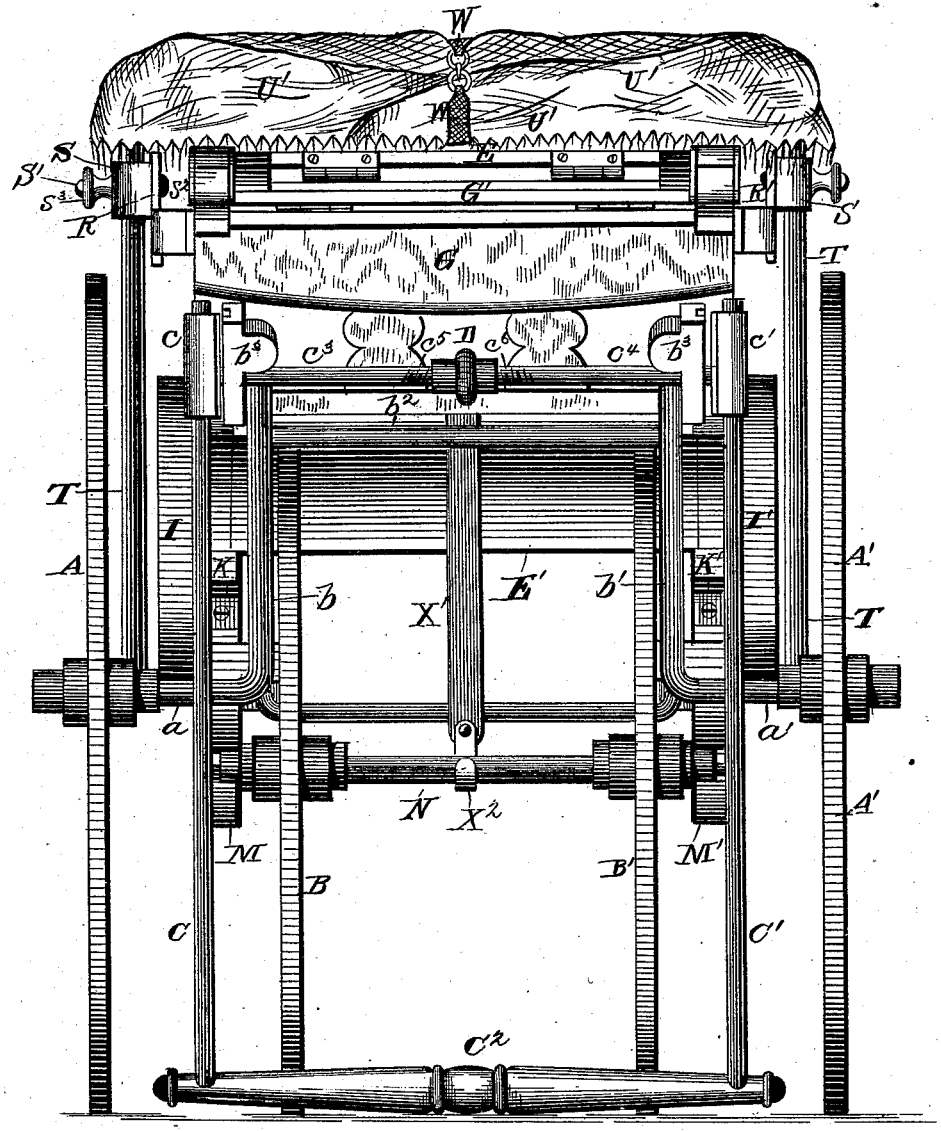

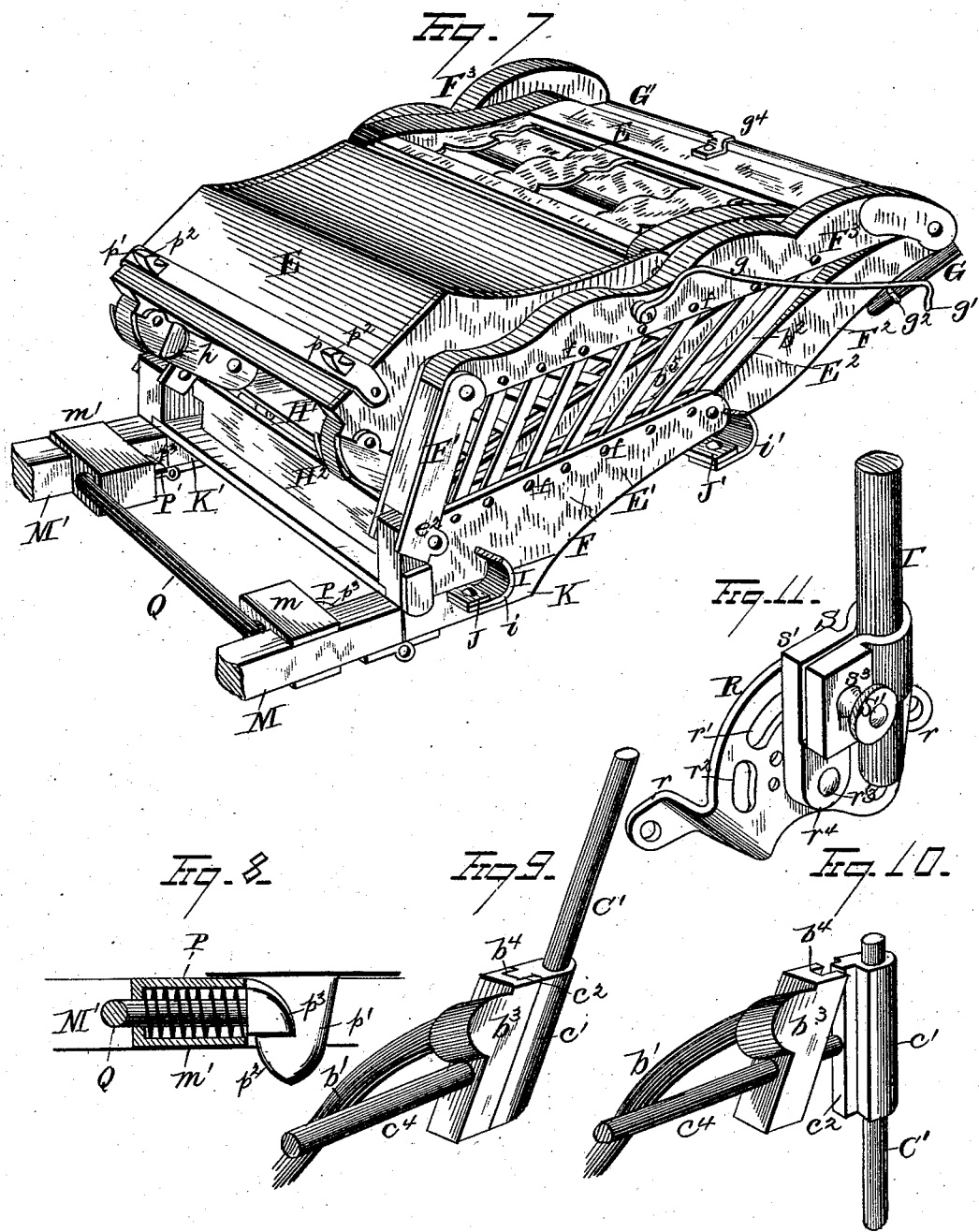

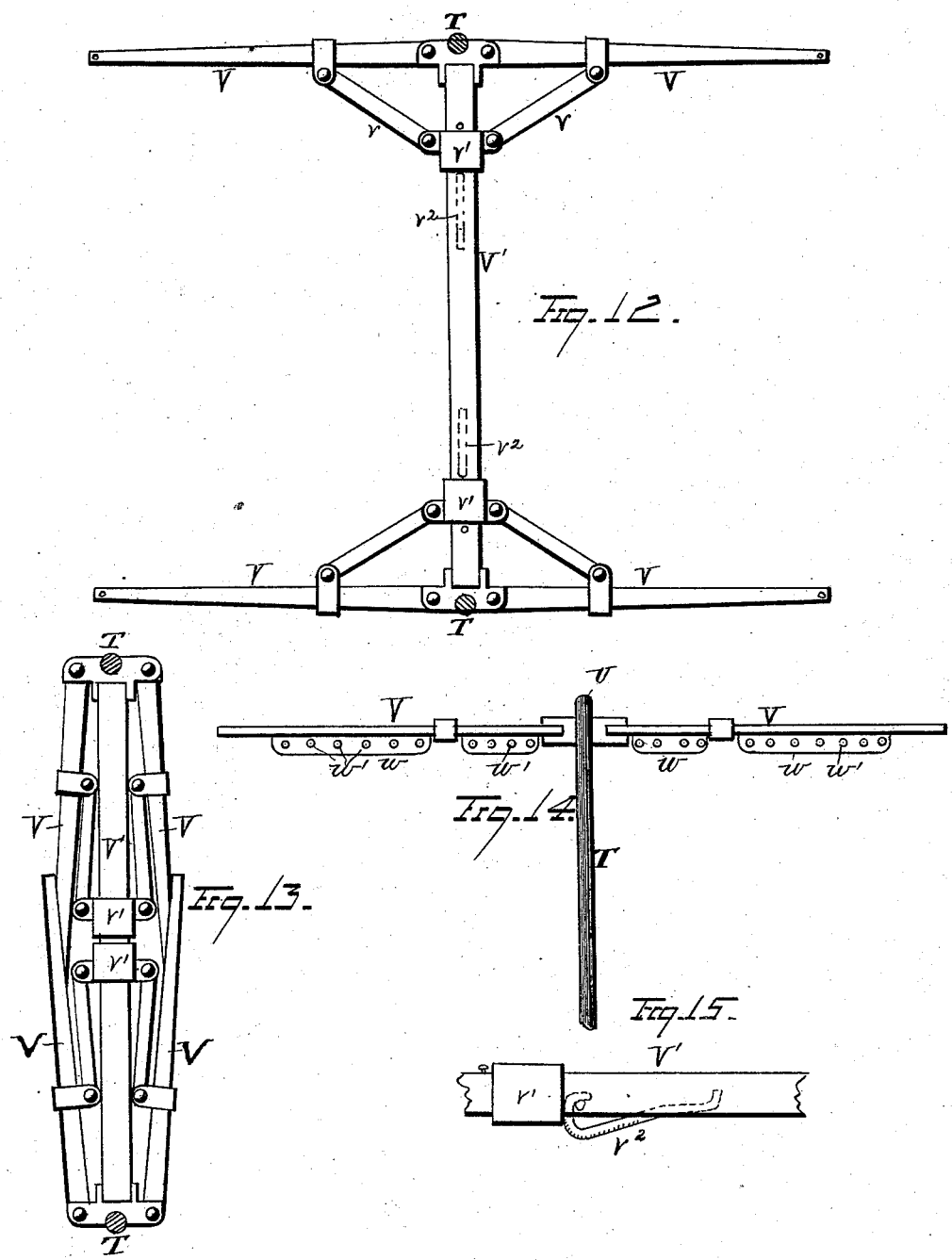

UNITED STATES PATENT OFFICE.

F. HERRMAN JURY, OF NEW YORK, N. Y.

IMPROVEMENT IN CHILDREN'S CARRIAGES.

Specification forming part of Letters Patent No. 215,283, dated May 13, 1879; application filed October 16, 1878.

*To all whom it may concern:*

Be it known that I, F. HERRMAN JURY, of New York, in the county of New York and State of New York, have invented certain new and useful Improvements in Children's Carriages; and I do hereby declare the following to be a full, clear, and exact description of the invention, such as will enable others skilled in the art to which it pertains to make and use it, reference being had to the accompanying drawings, which form part of this specification.

My invention relates to an improvement in children's carriages; the object being to provide a child's carriage of neat and tasteful design, and adapted to be folded into small compass for transportation.

My invention consists in certain essential features of construction and combinations of parts, as will hereinafter appear from the following description and claims.

Figure 1:
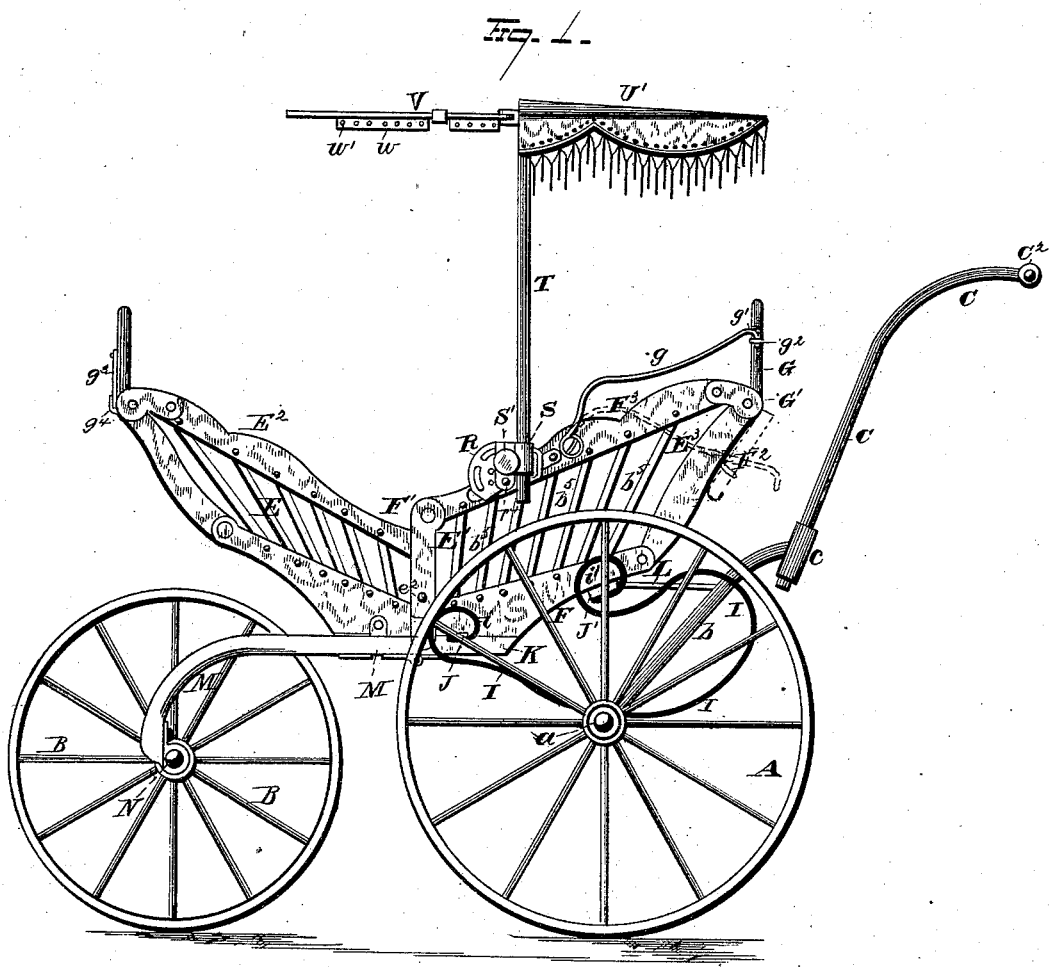
Figure 2:
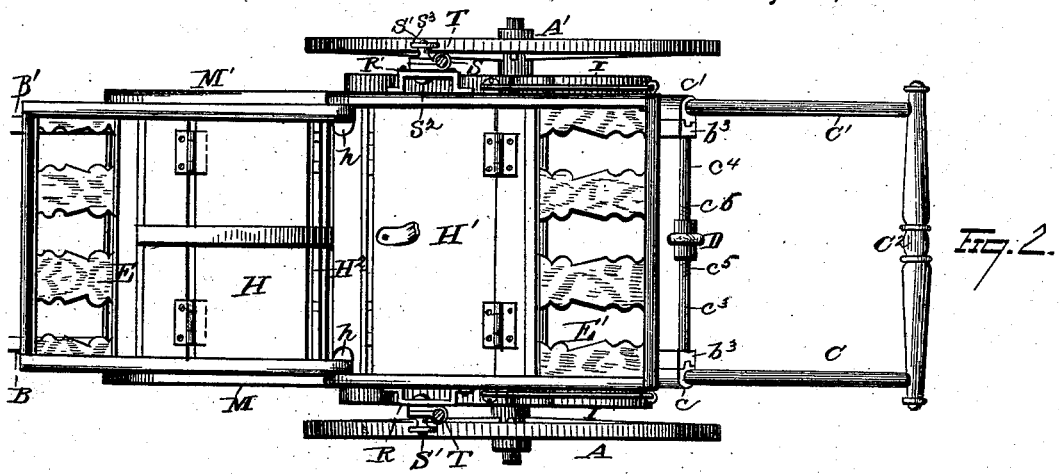
Figure 3:
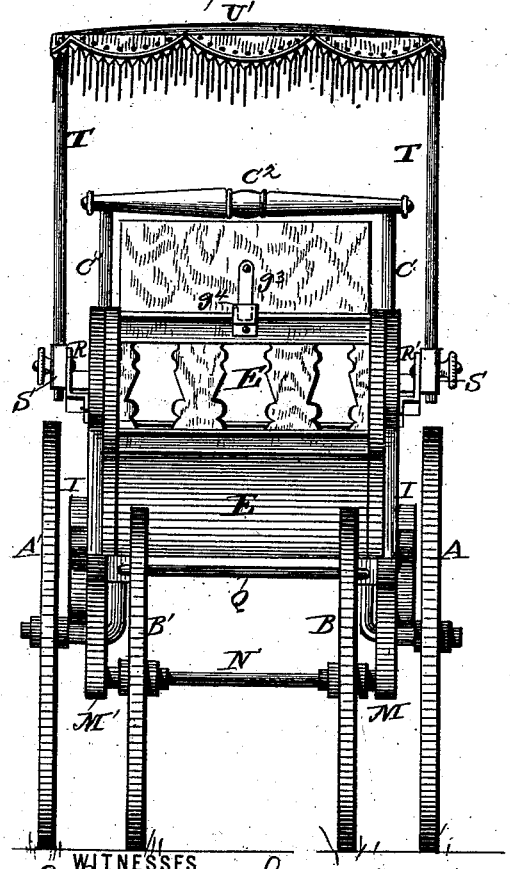
Figure 4:
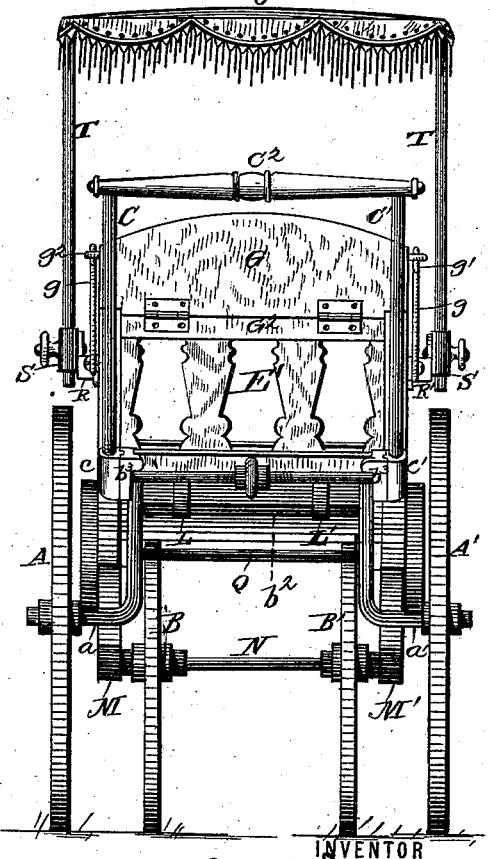
Figure 5:
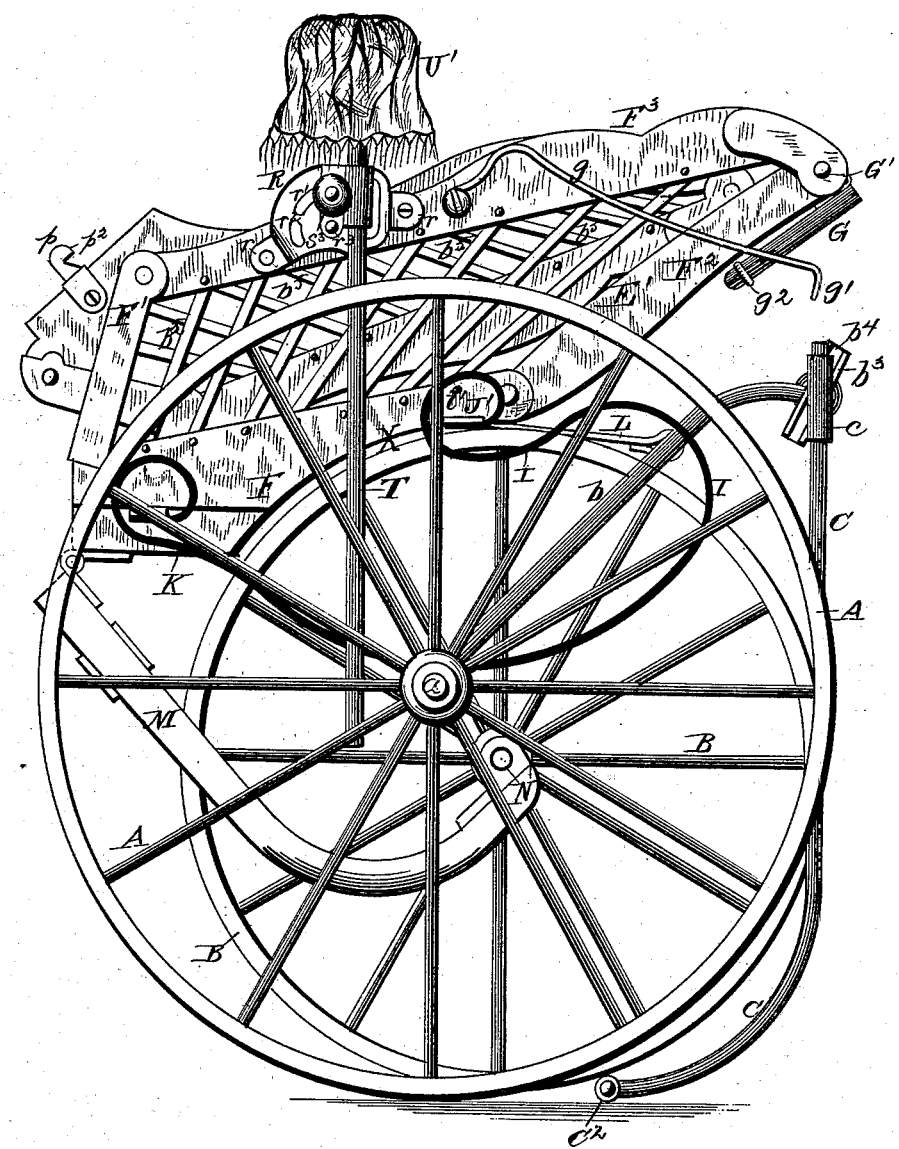

In the accompanying drawings, Figure 1 is a side elevation of my improved carriage. Fig. 2 is a plan view. Fig. 3 is a front elevation; Fig. 4, a rear elevation. Fig. 5 is a side elevation of the carriage when folded together for transportation. Fig. 6 is an end view of the carriage when folded. Fig. 7 is a detached view of the carriage-body with its sections folded together. Fig. 8 is a detached view of the locking mechanism for securing the side bars to the front section of the carriage-body. Fig. 9 is an enlarged view of the mechanism for securing the handles in position. Fig. 10 is a similar view, showing the handles dropped down between the rear wheels. Fig. 11 is an enlarged view of one of the devices for securing one of the top standards in an adjustable position. Fig. 12 is a plan view of the umbrella-top frame when opened or distended. Fig. 13 is a similar view, showing the frame contracted. Fig. 14 is a side elvation of the umbrella-top frame. Fig. 15 is a detached view of the spring-catch of the umbrella-top frame.

A A' are the rear supporting-wheels of the carriage, and B B' the front wheels of the same. Rear wheels, A A', are each mounted on separate or divided axle-arms $a$ $a'$, which extend inwardly a short distance, and are constructed with backward and upward extensions $b$ $b^1$, which latter are united by a cross-bar, $b^2$. To the extreme rear ends of the axle-extensions $b$ $b^1$ are rigidly secured the elongated holders $b^3$, the latter being arranged at the desired angle of the handles when secured in position. Holders $b^3$ are each formed with a groove, $b^4$, extending throughout their length.

C C$^1$ are handle-arms, their outer ends being rigidly secured to the handle C$^2$. The opposite ends of the handle-arms are provided with sleeves $c$ $c^1$, each of which is furnished with a rib, $c^2$, which is adapted to snugly fit within the grooves $b^4$ in holders $b^3$. To the sleeves $c$ $c^1$ are attached the rods $c^3$ $c^4$, which are inserted through openings in the holders $b^3$, and are provided on their inner and adjacent ends with right and left hand screw-threads $c^5$ $c^6$. An adjusting hand-nut, D, provided on opposite ends with internal right and left hand screw-threaded ends, engages with the screw-threaded ends of the rods $c^3$ $c^4$. By turning the hand-nut D in one direction the handle-arms are forced apart, disengaging the locking mechanism, and thus enabling the handle to be dropped between the rear supporting-wheels.

When it is desired to secure the handles in position for use, the handle-arms are raised until the ribs on the sleeves are brought in line with the grooves in the holders. The adjusting-nut is then turned so as to draw the handle-arms toward each other, and thus firmly secure the ribs on the sleeves within the inclined grooves in the holders on the extended arms of the rear axles.

The carriage-body consists of the front and rear sections, E E$^1$, the front section being of less width than the rear section, so that its side frames may be inserted between the forward ends of the side frames of the rear section, E$^1$, and pivoted thereto by bolts $e^2$. Each section of the carriage-body is provided with folding sides E$^2$ and ends E$^3$, which are constructed as follows: F are the bottom rails of the rear section, E$^1$, to the forward and rear ends of which are pivoted, hinged, or jointed the front and rear side-frame standards, F$^1$ and F$^2$, which latter have pivoted or hinged to their upper ends the top rail, F$^3$. The open space within the bottom and top rails and front and rear standards of each side frame is inclosed by means of the slats $b^5$, which are pivoted at opposite ends to the top and bottom rails, $F^3$ and F.

In order that the pivoted slats may not offer any sharp projecting ends, which would soon destroy the upholstering of the carriage, or, if left without covering, injure the occupant of the carriage, the top and bottom rails are grooved to receive the opposite ends of the slats, and the pins or rivets $f$ extend through said rails and the ends of the slats.

When the carriage is in use it is provided with side frames, of any desired height, and of fanciful or tasty design, which serve to impart a comfortable and elegant appearance to the carriage, as well as to secure comfort and safety to the child.

When it is desired to fold the carriage into the smallest compass possible, the sides are folded together, as represented in Fig. 7. The rear section is provided with a supplemental hinged back, G, which is hinged to the upper edge of the carriage-back G'. When not in use, the supplemental back is folded snugly against the carriage-back, as represented in dotted lines in Fig. 1.

When it is desired to give a more extended support for the occupant of the carriage, or for a pillow, the back G is turned up into position, as indicated in full lines in Fig. 1, and secured in position by the rods $g$, which are pivoted to the top rails, and provided with hooks $g^1$ on their free ends, that engage with studs $g^2$, attached to the side edges of the back G. The front section, E, is also provided with a hinged dash-board, which may be folded over within section E, as represented in Fig. 7, when not desired for use; but when employed it is raised into the position indicated in Fig. 1, and secured in place by an oscillating locking-bar, $g^3$, which engages with a catch, $g^4$, on the front of the carriage-body.

The front and rear sections are each provided with hinged seats H H¹, each of which is furnished with hinged supports H². When the front section is occupied by a child, the rear seat, H¹, is folded down flat against the bottom of the rear section, and the front seat, H, raised, and the support H² turned at right angles with the bottom of the carriage. The rear seat, H¹, may also be arranged in proper position in the same manner, and the front seat folded down against the bottom.

When it is desired to make a bed of the carriage-body to allow the child to sleep, the rear seat may be extended and the hinged support arranged to rest upon the flanges $h$, attached to the rear standards of the front section.

The rear section, E¹, of the carriage-body is supported by the springs I. Each spring is attached to the axle-arm, and the opposite ends formed into coils $i$ $i'$, the extreme ends of which are attached to cross bars or slats J J'. The front cross-bar, J, extends beneath the forward portion of the rear section, E¹, of the carriage, between the bottom rails and sills or side bars, K K', and projects outward from the sides of the body a sufficient distance to allow of the attachment of the coils $i$ on the forward ends of the spring I. The extreme ends of the rear coils, $i'$, are attached to the projecting ends of the rear cross-bar, J', which is attached to the rear ends of the bottom rail of the rear section of the carriage-body.

L L' are short springs, their inner ends being attached to the rear cross-bar, J', and the outer ends to the cross-bar $b^2$, which connects the rear extensions of the axle-arms.

It will thus be observed that the carriage-body is suspended between the springs I I', and the latter, by their peculiar shape and arrangement, allow the body to yield gently as the load is transported over rough and uneven places.

The short springs L L' serve to re-enforce the main springs, and prevent the rear section from tipping backward too far for the comfort of the occupant of the carriage.

M M' are folding side bars, the forward ends of which are downwardly curved, and support the forward axle, N, upon which are journaled the front supporting-wheels, B B', of the carriage.

The rear ends of the side bars, M M', are hinged to the forward ends of the side bars, K K', of the rear section. Side bars, M M', are provided with housings $m$ $m$, on their inner sides, near their ends. P P' are bolts placed within said housings, and forced outwardly by springs. To the rear ends of bolts P P' is secured a hand-bar, Q, for operating both bolts simultaneously.

$p$ $p^1$ are catches secured to the under side of the front section, E, of the carriage-body. When the front section is downwardly pressed, the inclined faces $p^2$ of catches $p$ $p^1$ strike the inclined ends $p^3$ of the spring-pressed bolts P P', forcing the latter back until the bottom rail of the body rests upon the side bars, M M', when the bolts engage with the catches, and serve to lock the front section, E, fast to the side bars, M M'. When the parts are locked together, the body is thoroughly braced and secured.

R R' are umbrella-standard plates, which are formed with flanges $r$, and attached to the top rails of the rear section, E¹, of the carriage-body. Each standard-plate is provided with arc-shaped slots $r^1$ $r^2$, which are struck from a central point, $r^3$, at which point is pivoted the depending flange $r^4$ of a clamp-socket, S, which latter is constructed of a metallic plate bent into U form, with a bolt, S', extending through its thickened ends $s^1$. Bolt S' is of angular form, and extends through the clamp and the arc-shaped slot $r^1$ in the standard-plate, the head $s^2$ of the bolt resting against the inner surface of the plate. The outer end of the bolt is screw-threaded and provided with a hand-nut, $s^3$. By tightening the nut $s^3$ the umbrella-standards T may be firmly held in any desired vertical adjustment. When it is desired to vary either the vertical or lateral adjustment of the umbrella, the nut $s^3$ is loosened, thus allowing the clamp to expand, and then the clamp may be secured to the plate at any desired angle at which the umbrella is to be placed, and also the standards are secured at any desired height.

When it is desired to place the umbrella at any angle over the front section, E, of the carriage, the adjusting-bolt is placed in the arc-shaped slot $r^2$, and the umbrella-top adjusted in the manner hereinbefore set forth. The umbrella-top may be thrown either forward or backward, and, if desired, may be lowered, so that its rear end will fit closely against the upper edge of the carriage-back. The adjustment is easily effected, and the mechanism is of simple and durable construction, and not liable to get out of order by unskillful handling.

The umbrella-top is constructed as follows: T are the umbrella-top standards, which are preferably formed in single piece with the bow-top cross-bar U, to which is attached the covering U'. V are folding side frames, the inner ends of which are hinged to T-shaped brackets secured to opposite ends of the cross-brace V'. To the folding sides V are pivoted the outer ends of links $v$, the inner ends of the same being pivoted to slides $v^1$, mounted on the cross-brace V'. $v^2$ are spring-catches similar to those employed on ordinary umbrellas, to keep the side frames locked in an expanded or extended position. The folding sides V are furnished with depending flanges $w$, having any number of perforations, $w'$, formed therein, for the insertion of the thread or cord for the attachment of the covering thereto. The sides V may be folded snugly against the cross-brace, and the elastic strap W secured around the covering, thus securing the top in a compact condition for stowage or for transportation.

Having described the construction of the several parts of my improved child's carriage, I will now describe the manner of folding the same into small compass for packing or transportation.

The umbrella-top is first folded together in the manner above described, and secured by the elastic strap W. The hand-nuts for regulating the adjustment of the umbrella-top standards are then loosened, and the top forced downward and backward until it rests upon the rear edge of the back of section $E^1$ of the carriage-body. The hand-bar attached to the spring-pressed bolts which lock the front section of the carriage-body to the folding side bars is pulled outwardly, releasing the catches, and the front section, E, is then folded flat against the rear section, $E^1$, of the carriage-body. The folding side bars, which support the front wheels, are then folded beneath the rear section, $E^1$.

It will be observed that the under side of the rear section, $E^1$, of the carriage-body is curved at X, to allow the front wheels to be carried backward and upward as far as possible, the front wheels being received between the rearwardly-inclined extensions of the rear axles. The parts are then secured against displacement by means of a strap, $X^1$, one end of which is attached to the front section, $E^1$, while the opposite end of the strap is provided with a hook, $X^2$, which engages with the front axle, as represented in Fig. 5.

If it is desired to pack the carriage in a box, the handle is turned down against the front wheels, as illustrated in full lines in Fig. 5: but if it is desired to carry the carriage like a valise, the handle is turned up in position to be grasped by the hand.

The construction and arrangement of the several parts of my improved child's carriage are such that it may be folded into the smallest possible space, and be readily carried by hand, thereby rendering it especially adapted for use at sea-side or country resorts. Again, the carriage may be packed in a box but slightly exceeding the diameter of the rear supporting-wheels, and thus a great saving in bulk and freight charges is effected.

When unfolded and arranged for use, the carriage is furnished with all the conveniences and attachments of expensive non-folding carriages. It is of stylish appearance, the body being well elevated above the wheels, and the springs, being arranged in the manner shown and described, afford the maximum comfort and ease to the occupant of the carriage.

Having fully described my invention, what I claim as new, and desire to secure by Letters Patent, is—

1. A carriage-body consisting of front and rear sections hinged to each other so that the front section may be folded upon the rear section, and between the sides thereof, each section of the carriage-body being provided with folding sides, whereby the hinged sections may be folded into the smallest compass possible, substantially as set forth.

2. A carriage-body consisting of front and rear sections hinged to each other so that the front section may be folded upon the rear section, and between the sides thereof, the front and rear sections being provided with folding sides having slats pivoted thereto, thereby constituting open-work sides for the carriage-body, substantially as set forth.

3. In a carriage-body, the combination, with a grooved bottom rail, of a folding top rail grooved on its lower side, and slats, the opposite ends of which are pivoted within the grooves in the top and bottom rails, substantially as set forth.

4. The combination, with a carriage-body consisting of front and rear sections hinged to each other so that the front section may be folded upon the rear section, of seats hinged to the bottoms of each section, and arranged as described, so that either seat may be employed, or one or both may be folded against the bottom of the carriage, substantially as set forth.

5. The combination, with the front section of a folding carriage-body, of a hinged dash-board, and an oscillating locking-bolt pivoted to said hinged dash-board, said bolt adapted to engage with a catch-piece attached to the carriage-body, substantially as set forth.

6. The combination, with the rear supporting-wheels of a child's carriage, of separate or divided axles provided with inclined arms, and means for securing the handle-arms to the outer ends of said axle-arms, substantially as set forth.

7. The combination, with rearwardly-inclined axle-arms having grooved holders secured thereto, of handle-arms provided with ribbed sleeves, and suitable means for connecting said sleeves and grooved holders, substantially as set forth.

8. The combination, with grooved holders and ribbed sleeves, the latter attached to the handle-arms, of adjusting-rods attached to the ribbed sleeves and extending through the grooved holders, the adjacent ends of said rods having right and left hand screw-threads formed thereon, and an adjusting-nut provided with right and left hand screw-threaded ends, substantially as set forth.

9. The combination, with a cross-bar connecting the rearwardly-inclined axle-arms, of springs attached to the rear portion of the carriage-body and to said cross-bar, substantially as set forth.

10. The combination, with the folding side bars having the front supporting-wheels connected therewith, and having bolt-casings attached to their inner sides, spring-pressed bolts placed within said casings, and a handbar attached to the rear ends of said bolts, of catches rigidly secured to the bottom of the front hinged section of the carriage-body, substantially as set forth.

11. The combination, with a folding carriage-body, the rear section thereof being partly of concave form on its under side, of folding side bars having the front wheels connected therewith, and divided rear axles, whereby the front wheels may be folded beneath the rear section of the carriage-body, in small compass, substantially as set forth.

12. In a folding child's carriage, the jointed sections provided with a strap, in combination with the front axle, whereby the whole is held together when folded, substantially as set forth.

13. The combination, with a standard-plate constructed with arc-shaped slots, of a U-shaped friction-clamp pivoted to said plate, and an adjusting-bolt which extends through said friction-clamp and arc-shaped slot, substantially as set forth.

14. The combination, with the cross-brace of an umbrella-top, of T-shaped brackets secured to the opposite ends thereof, and horizontally-folding side bars or frames hinged or pivoted to said brackets, substantially as set forth.

15. The combination, with the cross-brace of an umbrella-top and horizontally-folding side bars, of slides connected with said cross-brace, and links having their opposite ends pivoted, respectively, to said slides and folding side bars, substantially as set forth.

16. The combination, with the cross-brace of an umbrella-top, and four horizontally-folding arms or side bars hinged thereto, of slides and links for connecting said brace and folding arms, and spring-catches attached to the cross-brace, substantially as set forth.

17. In an umbrella-top, the folding arms provided with depending perforated flanges, substantially as set forth.

In testimony that I claim the foregoing I have hereunto set my hand this 9th day of October, 1878.

F. HERRMAN JURY.

Witnesses:
AUGUST WOLLENWEBER,
T. J. McKEE.